(12) United States Patent
Golle et al.

(10) Patent No.: US 8,272,613 B2
(45) Date of Patent: Sep. 25, 2012

(54) MOUNTING DEVICE

(76) Inventors: Matthias Golle, Erding (DE); Christoph Hein, Munich (DE); Kurt Hoehe, Langenau (DE); Matthias Laske, Juelich (DE); Bernd Ruess, Ulm (DE); Hyunwoo So, Garching (DE)

( * ) Notice: Subject to any disclaimer, the term of this patent is extended or adjusted under 35 U.S.C. 154(b) by 601 days.

(21) Appl. No.: 12/225,547

(22) PCT Filed: Mar. 30, 2007

(86) PCT No.: PCT/EP2007/002907
§ 371 (c)(1),
(2), (4) Date: Aug. 24, 2009

(87) PCT Pub. No.: WO2007/112988
PCT Pub. Date: Oct. 11, 2007

(65) Prior Publication Data
US 2010/0001152 A1    Jan. 7, 2010

(30) Foreign Application Priority Data
Mar. 31, 2006 (DE) .................... 10 2006 015 148

(51) Int. Cl.
*A47G 1/10* (2006.01)
(52) U.S. Cl. ............... 248/316.7; 248/74.1; 248/300
(58) Field of Classification Search ........... 248/220.21, 248/300, 316.7, 316.1, 316.2, 74.1, 74.2; 72/379.2
See application file for complete search history.

(56) References Cited

U.S. PATENT DOCUMENTS

| | | | |
|---|---|---|---|
| 2,257,855 A | 3/1939 | Place | |
| 2,541,828 A * | 2/1951 | Peck | 248/222.12 |
| 3,092,176 A | 6/1963 | Kramer | |
| 3,322,018 A | 5/1967 | Moehlenpah et al. | |
| 3,363,864 A * | 1/1968 | Olgreen | 248/68.1 |
| 3,486,738 A | 12/1969 | Eklund | |
| 3,638,892 A * | 2/1972 | Boye et al. | 248/300 |
| 3,703,747 A | 11/1972 | Hamman | |
| 4,356,719 A * | 11/1982 | Sutherland et al. | 72/379.2 |
| 5,107,623 A | 4/1992 | Weil | |
| 5,656,353 A | 8/1997 | Butler | |
| 5,743,497 A * | 4/1998 | Michael | 248/68.1 |
| 6,021,986 A | 2/2000 | Murdock | |
| 2006/0163222 A1 | 7/2006 | Dance et al. | |
| 2007/0057132 A1* | 3/2007 | Case | 248/300 |
| 2008/0166581 A1* | 7/2008 | Grott et al. | 428/594 |
| 2008/0170410 A1* | 7/2008 | Strazzanti et al. | 362/546 |
| 2008/0187408 A1* | 8/2008 | Babej et al. | 411/181 |

(Continued)

FOREIGN PATENT DOCUMENTS

RU    2237508    10/2004

(Continued)

*Primary Examiner* — Ramon Ramirez (74) *Attorney, Agent, or Firm* — Marshall & Melhorn, LLC (57) ABSTRACT

The present invention relates to a mounting device having a metallic base plate, from which multiple fastening projections project, as well as a method for producing this mounting device. The mounting device is obtainable by incising multiple tab blanks into the surface of the base plate while leaving at least one connection section per tab blank. The fastening projections are produced by bending the tab blanks out of the base plate, multiple fastening projections forming a group and the fastening projections within the group being bent in such a way that sections lying distal from the base plate are inclined toward the interior of the group and a section lying between the connection section and inwardly inclined section projects toward the exterior of the group.

35 Claims, 7 Drawing Sheets

U.S. PATENT DOCUMENTS

2010/0038211 A1* 2/2010 Stricker et al. ................ 198/658
2012/0025689 A1* 2/2012 Kuhnert et al. ............... 313/140

FOREIGN PATENT DOCUMENTS

| SU | 580867 | 11/1977 |
| SU | 1212451 | 2/1986 |
| WO | WO 99/04996 A1 | 2/1999 |
| WO | WO 2004/028731 A1 | 4/2004 |

* cited by examiner

MOUNTING DEVICE

FIELD OF THE INVENTION

The present invention relates to a mounting device having a metallic base plate, from which multiple fastening projections project, and a method for producing such a mounting device, and its use.

BACKGROUND OF THE INVENTION

In many industrial and other areas (e.g., construction, automobile construction, domestic, etc.), it is normally necessary to fix metallic components or workpieces or connect them with other components. It is frequently desirable for this purpose to produce the retainers and/or the connections in a simple and rapidly executable way, without special tools, such as welding or screwing tools, being required for fixing the fasteners. In the field of plastic components, such a retainer is achieved, for example, by using hook-and-loop closures as fasteners. However, these plastic hook-and-loop closures are not employable for manifold uses, because they do not have the required durability and temperature stability and/or are not electrically conductive.

A method for producing a metallic mounting device is already known from WO 2004/028731 A1. It is suggested that multiple oblong areas on the surface of a workpiece be caused to melt using an electrode beam, and the molten material be shifted along the longitudinal axis and allowed to solidify again, so that a hole and an area projecting from the surface results in each case. In order to achieve a sufficient length of the projections, the method must be repeated multiple times. The workpiece is to be able to be connected to other workpieces by the structuring of the surface thus resulting, connections of workpieces made of metal and fiber composite material being cited as preferable. A device for generating an electrode beam and a control device for controlling the beam are required for this method. In addition, the method has to be repeated multiple times in order to obtain sufficiently large structures. Therefore, the structuring of the surface according to this method is relatively difficult and complex. High precision in the production is also necessary. Furthermore, it is also not possible with the aid of the method to implement the projections with predefined specific shapes, which would be desirable for adapting the adhesive properties of the structured surface of the workpiece to the material structure of the workpiece to be connected.

Because of the high cost and time pressure in production in industrial operations, in particular in the automobile industry, there is a need, as already noted above, for mounting devices, by which metallic components and devices in particular may be fixed and/or fastened rapidly and easily, without additional tools or complex production methods being necessary. In addition, the mounting device is to be durable and temperature stable. The object of the present invention is accordingly to specify a mounting device of this type and a method for its production, which ensures secure retention of components in spite of relatively simple production, without additional tools being necessary for the fastening, and which is temperature stable.

SUMMARY OF THE INVENTION

The present invention thus relates to a mounting device having a metallic base plate, from which multiple fastening projections project, which is obtainable by incising tab blanks into the surface of the metallic base plate while leaving one connection section per tab blank. The fastening projections are obtained by bending the tab blanks out of the base plate. Multiple fastening projections form a group, and the fastening projections within this group are each bent in such a way that a section lying distal from the base plate is inclined toward the interior of the group and a particular section lying between connection section and inwardly inclined section projects toward the exterior of the group.

The basic idea of the present invention is accordingly to incise multiple contours, by which the tab blanks are produced, into the metallic base plate, in order to thus produce multiple fastening projections on the metallic base plate in a further step by bending. It is to be ensured that the contours incised in the base plate are not implemented as closed per se and a connection section is left. Incising contours in the base plate is to be understood to mean that the base plate is cut through completely in the area of the contours. By incising the contours, the tab blanks may be defined in shape and size and reproducible fastening projections may be produced.

Due to the simple construction of the mounting device according to the present invention, it is relatively uncomplicated and rapid to produce by simple metal processing techniques, such as punching, cutting, and bending. Moreover, the capability of the mounting device of clawing into a workpiece or component is increased and therefore the retention force of the mounting device is improved overall by the implementation of the fastening projections, in contrast to the essentially rounded fastening projections of WO 2004/028731 A1. In addition, increased elasticity is obtained by the curvature of the fastening projections, which also results in a loadable connection and improved damping in the event of movement absorption.

A mounting device completely comprising metal is obtained, which may be used as a "metallic hook-and-loop closure". It may be loaded with high tensile forces and has very good stability even at very high or very low temperatures. The mounting device may be connected to a workpiece or component without further steps, such as welding or screwing, having to be performed. However, it is nonetheless possible to combine such additional fastening steps with the mounting device according to the present invention (e.g., pre-mounting of components using the mounting device according to the present invention and subsequent, final fastening by welding or screwing). The advantages of the metallic workpiece are also displayed here, because all types of metal connection are usable i.e., also soldering, or riveting, and clinching.

Multiple fastening projections are combined into a group according to the present invention. These fastening projections do not all have to be implemented identically, but this is preferable. Within this group, the fastening projections are curved in such a way that, viewed from the base plate, they first project outward and then curve inward toward the interior of the group in a section further distal from the base plate. The free end sections are preferably curved inward overall. The group thus overall obtains an arrow-shaped or mushroom-like rounded outer contour, which makes insertion into the counterpart to be fastened easier. Simultaneously, removal therefrom is made more difficult by the outwardly curved section. The fastening projections are not only each elastically deformable due to the curvature of their contour, but rather also in relation to the remaining fastening projections of the group. This significantly eases adaptation to the counterpart to be fastened, simplifies the production of the connection, increases the stability, and improves the damping properties of the composite obtained.

In a simple and preferred variation of the present invention, a group comprises a pair of essentially diametrically opposite fastening projections. In principle, the fastening projections of a group do not have to be implemented identically, but this is preferable from a practical viewpoint. The two fastening projections are thus expediently situated essentially mirror symmetric, which does not preclude deviations in shape and size due to production, however.

In one embodiment of the present invention, the connection sections of the fastening projections are situated along a ring. The number of the fastening projections within the ring may be odd or even. In the latter case, the ring group is composed of multiple groups of fastening projections assigned to one another in pairs, as were described in the prior section. The shape of the ring on which the connection sections of the fastening projections are situated is arbitrary in principle. For example, polygonal, in particular square shapes preferably having one fastening projection per edge, are suitable. The material for the tab blanks may be taken either from the interior of the ring and/or from its external circumference, for example, as a function of the size of the ring and the size of the fastening projections to be produced.

In another embodiment of the present invention, the fastening projections are situated neighboring one another and having their connection sections along essentially parallel lines. All fastening projections situated neighboring one another along one line expediently have their inwardly inclined sections pointing in the direction of the fastening projections on the neighboring line and vice versa. With exactly diametrically opposite fastening projections, a parallel row of fastening projections may also be viewed as multiple groups formed by one pair of fastening projections each. The configuration of the fastening projections may also be staggered, however, i.e., laterally offset in relation to the neighboring row, the parallel row configuration then forming one group of fastening projections overall.

The number of the fastening projections and/or groups of fastening projections per base plate may be selected arbitrarily. Typically, multiple fastening projections or groups are provided on a base plate. The size and shape of the fastening projections may also be varied in accordance with the predetermined conditions.

In a simple embodiment of the present invention, for example, the fastening projections are bent essentially C-shaped. The open sides of the Cs of a group point toward one another. "C-shaped" is not restricted to a uniform curvature over the length of the fastening projections. Rather, the radius of curvature may vary in the longitudinal extension direction of the fastening projections and, for example, may be smaller in the area neighboring the base plate than in the free end section of the fastening projections. Alternatively, ←-shaped fastening projections may be used.

In a preferred embodiment, the fastening projections have multiple bending points in their longitudinal extension. The curvature changes in the course of the fastening projections described above are thus achieved by multiple bends of the tab blanks. The bends may be implemented sharply, but preferably the bending points are rounded. A fastening projection expediently has at least two, but preferably three bending points in the area between the section inclined toward the interior of the group and the connection section. The bending point at which the fastening projection is bent out of the plane of the base plate is included in this number. The sections of the fastening projections located outside the bending points are preferably not curved and are essentially planar.

Fastening projections whose section projecting outward between the connection section and the inwardly inclined section, which will be referred to in the following as the protrusion section, runs at an angle of −10° to 40°, preferably 10 to 30°, and especially preferably 20 to 35° to the plane of the base plate (2), are especially suitable. With an embodiment of this type, the protrusion section may engage behind an associated counterpart to be fastened and thus cause sufficient fastening. The length of the protrusion sections is preferably between 0.05 and 0.8 mm, preferably 0.1 to 0.5 mm.

In order to ensure a sufficient length of the fastening projections, it may be expedient to provide a lengthening section in an area located between the connection section and the protrusion section. This expediently extends at an angle of 70 to 110°, in particular 85 to 95°, and preferably essentially perpendicularly in relation to the plane of the base plate. The length of the lengthening section is primarily directed according to the thickness of the counterpart to be fastened and is expediently selected as sufficient to allow a secure engagement of the fastening projections on the counterpart. A length of 0.1 to 1 mm, preferably 0.3 to 0.7 mm, may be specified as an example.

In addition, for example, the distance between the fastening projections of a group may be set by providing a widening section in an area located between the connection section and the lengthening section, which expediently extends at an angle of −15 to 15°, in particular −5 to 5°, and preferably essentially 0° in relation to the plane of the base plate. Its width is preferably from 0.05 to 0.8 mm, especially preferably 0.1 to 0.4 mm. The variation of the widening section also allows targeted adaptation to the counterpart to be fastened, for example, to the distance and/or the opening cross-section of fastening openings which are to accommodate the fastening projections.

The inclination of the inwardly inclined sections, i.e., preferably the free end sections, may also be selected in a targeted way in regard to the composition of the counterpart. By suitable setting of the inclination, for example, the fastening to the counterpart may be made easier. The inwardly inclined section preferably runs at an angle of 50 to 85°, more preferably 55 to 80°, and especially preferably 60 to 78° in relation to the plane of the base plate. Their length may be, for example, 0.5 to 3 mm, preferably 1 to 2 mm. All of the angles of curvature described above are expediently also tailored to one another in such a way that upon bending of the fastening projections and after production of the curves, the lowest possible tensions occur within a fastening projection.

The shape of the fastening projections is not especially restricted. The base of the fastening projections is preferably implemented as strip-like in each case. Rectangular tabs are preferred as the blanks of the fastening projections. The tab blanks may, however, also have different widths over their length and broaden in the direction toward the connection section at which they are connected to the base plate, for example. For the insertion of the tabs into the counterpart, it is preferable for the tabs to be tapered on their free end. In addition, they may have a number of projections on one or both sides which is arbitrary in principle. For example, protrusions may expediently be attached to one or both sides to improve the connection to the counterpart. It is preferable for the reversibility of the connections for the protrusions to have an obtuse angle in relation to the axis of symmetry of the tab. Among the fastening projections having lateral projections, those having an arrow or mushroom shape are preferred.

The shape and size of the fastening projections is directed to the type of intended use. The fastening projections are expediently implemented in such a way that they are capable of engaging in the counterpart to be fastened. The shape and size of the protrusions and the length of the body supporting the fastening projection(s) are selected accordingly. The thickness of the metallic base plate—and thus the thickness of the fastening projections bent out of the plate—is expediently directed according to the shear and tensile strain to be expected during and after the connection to the counterpart to be fastened. This is also true for the other dimensions of the fastening projections. The length of the fastening projections (in the bent state standing up out of the base plate) is expediently between 1 and 15 mm, in particular between 2 and 10 mm, and preferably 3 to 5 mm. The width of the tab blanks and/or the fastening projections is typically between 0.2 and 5 mm, preferably between 0.5 and 2.5 mm, especially preferably 1 to 1.8 mm. The maximum distance, measured between the exteriors of the areas protruding furthest outward of diametrically opposite fastening projections of a group, is 0.5 to 6 mm, preferably 1 to 5 mm, and especially preferably 2 to 3.5 mm, for example. In specific cases, however, the fastening projections may also be implemented using different dimensions to achieve optimum retention tailored to the particular existing conditions.

The fastening projections may be implemented on both sides of the metallic base plate. The mounting device may thus accommodate workpieces on both sides of the metallic base plate. In a preferred embodiment, fastening projections are only implemented on one side of the base plate, by which the number of fastening projections per unit area and thus the retention force are increased. In addition, the production is simplified. The number of fastening projections is directed—also as a function of their size and stability—to the requirements for the durability of the connection to be achieved and the counterpart to be fastened. Under certain circumstances, a single group of fastening projections, which may possibly also comprise only a single pair of fastening projections, may suffice. However, multiple groups of fastening projections are typically provided per base plate, for example, 1 to 18, preferably 2 to 9, pairs per square centimeter of base plate area, or a corresponding number of individual fastening projections if they are not situated in pairs.

The fastening projections are expediently implemented essentially uniformly and are distributed approximately evenly on the surface of the base plate. The manufacturing of the mounting device is simplified by the uniform implementation and, in addition, an even force absorption capability of the mounting device is achieved.

The metallic base plate is preferably implemented as thin sheet metal, preferably made of steel and in particular spring steel. The sheet thicknesses are, for example, from 0.1 to 1.0 mm, preferably 0.1 to 0.6 mm, especially preferably 0.15 to 0.3 mm. This implementation is especially well suitable for incising tab blanks and/or bending them. In principle, only a partial area of a metal sheet or metal film may be implemented as a base plate. To automate the production, the metal sheet is expediently used in strip form. Multiple base plates situated one behind another having projecting fastening projections are then shaped into the strip, and the individual mounting devices are cut out of the strip immediately thereafter or only shortly before use. The metal strip is preferably implemented as an endless strip.

Due to the special shaping of the fastening projections, they clamp in the counterpart, and a stable connection is thus formed between the base plate and the counterpart. In order to further increase the stability of the connection, it is expedient for the surface of the counterpart to be implemented as structured, so that the largest possible attack area is offered for the fastening projections. In addition, it is possible to three-dimensionally deform the counterpart for adaptation to the geometry of the base plate, which may be performed by embossing, for example. The counterpart is preferably implemented as a scrim, woven fabric, braid, knitted fabric, plush, looped fleece, or perforated plate made of plastic or especially metal. In the event of plush, looped fleece, and knitted fabric, structures having open or preferably closed loops are possible. For the perforated plates, arbitrary steels may be used in principle. In regard to their temperature stability in particular, counterparts made of stainless steel, preferably austenitic stainless steels or austenitic molybdenum (stainless) steels, are preferred. High-temperature alloys such as nickel alloys may also be used. In the cited embodiments, the fastening projections may clamp especially well in the counterpart. In addition, the overall composite is distinguished by high temperature resistance when it is made completely of metal, which not only allows use under extreme conditions, but rather also allow special application steps, such as sterilization by heat or radiation. Furthermore, the overall metallic composite has electrical conductivity. Magnetic properties may also be achieved by suitable selection of the metallic materials.

If a woven fabric is used as the counterpart, it is preferable to tailor this and the fastening projections to one another in such a way that one fastening projection engages behind two threads, i.e., a warp and a weft thread. A permanently stable fastening is thus ensured. In contrast, it is not necessary for a group of fastening projections to hook behind neighboring threads. Rather, it is also possible to engage behind threads which do not directly neighbor one another. It has an especially favorable effect on the production of the connection if the counterpart is implemented as a woven fabric having an open screen area of at least 40%, preferably at least 48%, and particularly at least 57%.

In the case of knitted fabrics, scrims, plush, or woven fabrics as the counterparts, a structural elasticity is achieved, which may be influenced in a targeted way by variation of the thread thickness. The elasticity results from the mobility of the threads to one another. The thinner the thread, the more elastic the composite. In addition, anisotropic properties may be obtained by different thread thicknesses in warp and weft threads. The suitability of thread thicknesses is strongly dependent on the type of the counterpart used. While in plush and scrim, 0.05 to 0.1 mm thick threads are used for the base knitted fabric/woven fabric and up to 0.3 mm thick threads are used for the superstructure, the thread thicknesses which are used for woven fabric are rather thicker and are typically in the range from 0.4 to 0.56 mm.

In another variation, the counterpart is a perforated plate. The holes are expediently implemented to accommodate one group of fastening projections each. The fastening projections of the group, for example, a diametrically opposite pair, slide with the sections inclined toward one another in front into an associated hole when the base plate is attached to the counterpart. As they advance further, the fastening projections are elastically deformed and move toward one another until—after the projections protruding furthest outward have pushed through the hole—they spring back out and the protruding sections engage behind the counterpart. The shape and size of holes and fastening projections are tailored to one another appropriately in order to allow this. In addition, centering of mounting device and counterpart to one another is possible by precisely fitted design. The perforated plate thickness is 0.1 to 2.0 mm, preferably 0.2 to 1.0 mm, larger plate thicknesses are usually preferred when the plate is itself an integral part of a component.

The holes of the perforated plate may have any suitable shape and configuration in principle. Round and in particular polygonal, above all rectangular or square holes are preferred from a manufacturing viewpoint, which are situated in parallel rows on the base plate, for example. In order to obtain the greatest possible number of holes—and corresponding fastening projections—holes of neighboring rows are preferably offset laterally toward one another, so that hexagonal hole patterns result, for example. The diameter of the holes must be large enough that the fastening projections are only elastically deformed as they pass through. The edge length of a rectangular hole in the perforated plate in the direction transverse to the particular fastening projections may be 0.1 to 0.7 mm, preferably 0.2 to 0.4 mm, less than the width, which two fastening projections situated in a pair, including their intrinsic thickness, span in the state not bent for insertion, in the same direction. The complementary edge length is at least 0.1 mm, preferably at least 0.2 mm, greater than the width of the particular fastening projections at the widest point of their protrusions. For circular holes, this is also true for the edge lengths of the rectangle in an envelope circle which describes the hole.

To increase the elasticity of the composite made of mounting device and counterpart, the edge area of the perforated plate may have elastically deformable areas around the holes. This may be achieved, for example, by providing multiple incisions running radially outward from the hole in the perforated plate. The resulting webs, which broaden outward, may be elastically deformed out of the plane of the perforated plate. The production of the connection is thus made easier and the connection receives additional elasticity. Moreover, it is possible to perform a right-angle bend in the area around the opening edge and/or in the area of the elastic webs, in order to displace the plane in which the counterpart is engaged behind by the fastening projections, out of the plane of the perforated plate and thus avoid thickening of the composite and/or dispense with a recess in the component to which the counterpart is attached.

In order to obtain adequate pre-tension even with perforated plates which are not very thick, the perforated plates may have beads at a distance to and around the holes. The bead height at least partially compensates for the reduction of the material thickness. In this way, a material savings and thus a weight reduction may also be achieved.

To ensure that the mounting device and the counterpart are situated in a predefined position to one another before the actual engagement of the fastening projections in the counterpart, the mounting device and the counterpart may have prefixing elements corresponding to one another. The prefixing elements are tailored to one another in such a way that the desired positioning of the counterpart and the mounting device to one another is achieved. The prefixing elements are preferably implemented so that they engage in one another in a formfitting way.

The base plate may either be provided as a separate part or may be a part in a larger component. For example, the base plate may be an edge section of a flat metallic component. In another variation, the separate mounting device is attached to a support component using its base plate. The support component is preferably implemented from metal and the mounting device is attached to the support component in a suitable way, for example, using laser welding or an otherwise typical welding method. Fastening projections are expediently implemented on the base plate of the mounting device on only one side, and the flat side of the base plate presses against the support component. In addition, in the embodiment in which the mounting device is implemented to engage in a counterpart, the counterpart may also be attached to a further support component or integrated therein.

Furthermore, the object on which the present invention is based is achieved by the method for producing the mounting device according to the present invention, in which a) multiple tab blanks are incised into the surface of the base plate while leaving at least one connection section per tab blank and b) the fastening projections are produced by bending the tab blanks out of the base plate.

The tab blanks incised in the base plate are expediently produced using a laser beam or by punching. By using a laser beam, it is possible to incise even relatively small tab blanks precisely into the metallic base plate and thus achieve the most uniform possible implementation of the tab blanks. Punching simplifies and accelerates the production procedure as a relatively simple metal processing technique, because multiple tab blanks may be punched out at the same time. Above all in the latter case, it is preferable from a manufacturing viewpoint if a free punch is produced around the tab blanks as they are incised. The width of the free punch is typically one to three times the thickness of the base plate, preferably up to 2.5 times. The free punches are generally to have a width of not more than 4 mm, preferably not more than 1.5 mm, and particularly approximately 0.3 to 1.0 mm. The free punches surrounding the fastening projections—except for the connection section—make bending the tab blanks out of the base plate easier, for example. For this purpose and for the following steps—i.e., steps a) and b)—a rolling continuous method or a method using progressive tools may be executed. In this way, it is possible to execute the various steps of the method in one work step and/or by one tool and thus further optimize the overall production method. Instead of working with narrow free punches, which are advantageous in principle for greater stability, in some applications, sections having larger areas may also be used.

Laser radiation may also be used to bend the fastening projections, in addition to mechanical bending, the fastening projections may also be produced using thermal bending. Both laser bending and also thermal bending are suitable in particular if only small piece counts are to be produced.

It is preferable in the production of the group of fastening projections and particularly pairs of essentially diametrically opposite fastening projections for a web delimiting the connection sections to remain between the cut-out tab blanks and for the tab blanks to be bent out of the base plate toward one another. The web expediently has a width, i.e., a distance between the connection sections of the fastening projections, of 0.2 to 2 mm, preferably 0.5 to 1 mm. Alternatively, it is also possible to take the material for the tab blanks not from the exterior of the group of the fastening projections, but rather from the interior of the group. A pair of essentially diametrically opposite fastening projections is then produced in such a way, for example, that the tab blanks are situated having connection sections facing away from one another in the base plate and are bent away from one another out of the base plate. A combination of both variations is also possible in principle.

Preferred areas of application of the mounting devices described according to the present invention are fastening and retaining components and devices in construction, in medical technology, in the domestic field, and in metalwork. In metalwork, the retention and fastening of metal parts in the automobile sector is especially preferred. The mounting device according to the present invention is particularly used there for attaching heat shields, noise dampers, and engine encapsulations, and for vibration damping of metallic connections.

Furthermore, the mounting device according to the present invention may be used for fastening components to heaters and stoves and for fastening the casing of pipes. Because the mounting device according to the present invention is implemented from metal, it is also especially suitable for being used in the field of component retainers and component connections in high-temperature or low-temperature applications, and for conducting electrical current.

BRIEF DESCRIPTION OF THE DRAWINGS

In the following, the present invention is described further on the basis of exemplary embodiments illustrated in the drawing. However, these examples are solely intended for explanation. The present invention is not restricted thereto.

FIG. 8 (*a*) schematically shows a partial top view of a further counterpart;

FIG. 8 (*b*) schematically shows a partial side view of the counterpart from FIG. 8 (*a*) in the direction of arrow A;

FIG. 9 (*a*) schematically shows a cross-section through a pair of fastening projections which penetrate through a counterpart;

FIG. 9 (*b*) schematically shows a cross-section through a pair of fastening projections which penetrate through a counterpart in an alternative configuration;

FIG. 9 (*c*) schematically shows a cross-section through a pair of fastening projections which penetrate through a counterpart in a further alternative configuration;

FIG. 10 (*a*) schematically shows a partial top view of a further counterpart;

FIG. 10 (*b*) schematically shows a partial side view of the counterpart from FIG. 10 (*a*) in the direction of arrow A;

FIG. 11 (*a*) schematically shows a partial top view of a further counterpart;

FIG. 11 (*b*) schematically shows a partial side view of the counterpart from FIG. 11 (*a*) in the direction of arrow A;

DETAILED DESCRIPTION OF THE PREFERRED EMBODIMENTS

In the various embodiments of the present invention illustrated in the figures, identical components are provided with identical reference signs.

Figure 1:
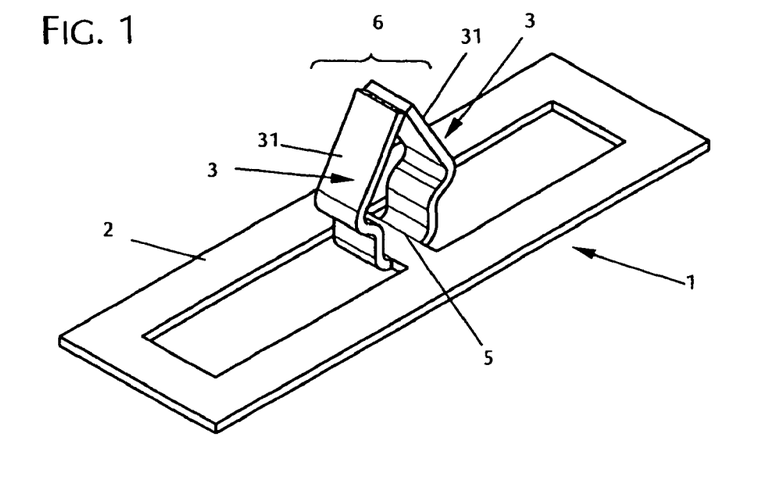
FIG. 1 schematically shows a perspective view of a mounting device according to the present invention.
Figure 2:
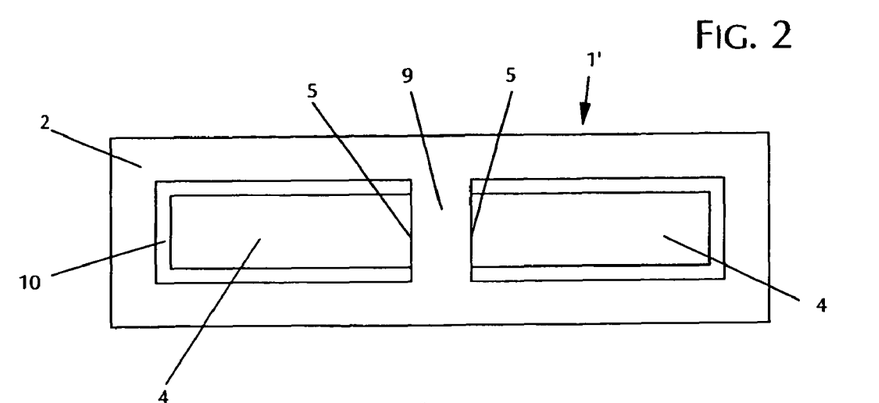
FIG. 2 schematically shows a top view of a blank of the mounting device from FIG. 1.

FIG. 1 shows a first exemplary embodiment of a mounting device 1 according to the present invention. It comprises a base plate 2, from which two fastening projections 3 are bent out projecting above one of the surfaces of the base plate 2. The production is performed from a blank 1', as is shown as an example in FIG. 2. The blank 1' is obtained by punching, or incising in another way, U-shaped free punches 10 in a metal plate made of spring steel, for example, in order to produce two rectangular, diametrically opposite tab blanks 4. These tab blanks 4 are still each connected to the base plate 2 at a connection section 5 and separated from one another by a web 9. After being cut free of the base plate 2, the tabs 4 are bent out of the plane of the base plate 2. The curves along the fastening projections 3 are expediently produced in the same work step. A progressive tool is preferably used for this purpose.

Figure 3:
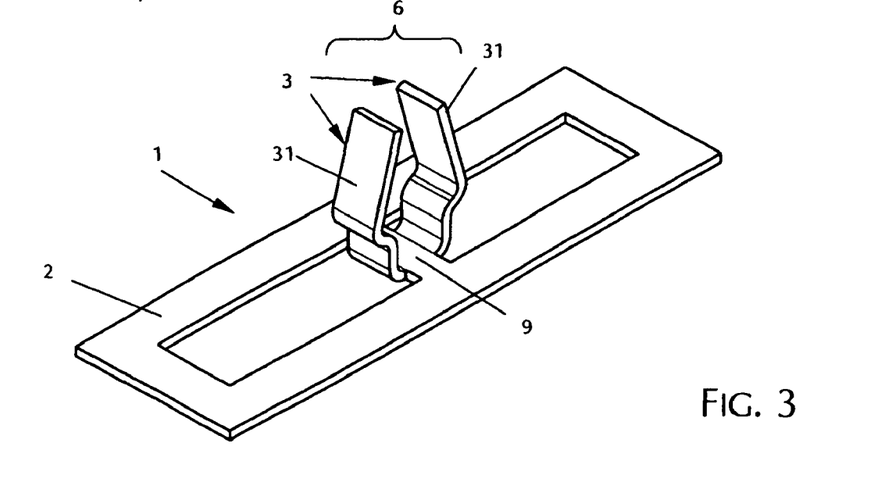
FIG. 3 schematically shows a perspective view of a further mounting device according to the present invention.

The curves in the course of the fastening projections 3 are produced in such a way that the fastening projections, which jointly result in a group 6, are implemented as essentially mirror symmetric. In addition to erecting the tab blanks 4 by bending around the connection sections 5, bends are produced in such a way that a lower area of the fastening projections 3, lying closer to the base plate 2, projects toward the exterior of the group 6 in each case and an upper area of the fastening projections 3, the free end sections 31 here, again inclines toward the interior of the group 6. Overall, an essentially arrow-shaped external contour thus results for the fastening projections 3 of the group 6. The free end sections 31 of the two fastening projections 3 inclining toward one another ease insertion of the mounting device 1 according to the present invention into the associated fastening openings of a counterpart. The end sections 31 do not have to be inclined as far toward one another as shown in FIG. 1. FIG. 3 shows a variation of the mounting device 1 illustrated in FIG. 1 having end sections 31 inclined much less toward one another. Otherwise, this mounting device essentially corresponds to that of FIG. 1.

Figure 4:
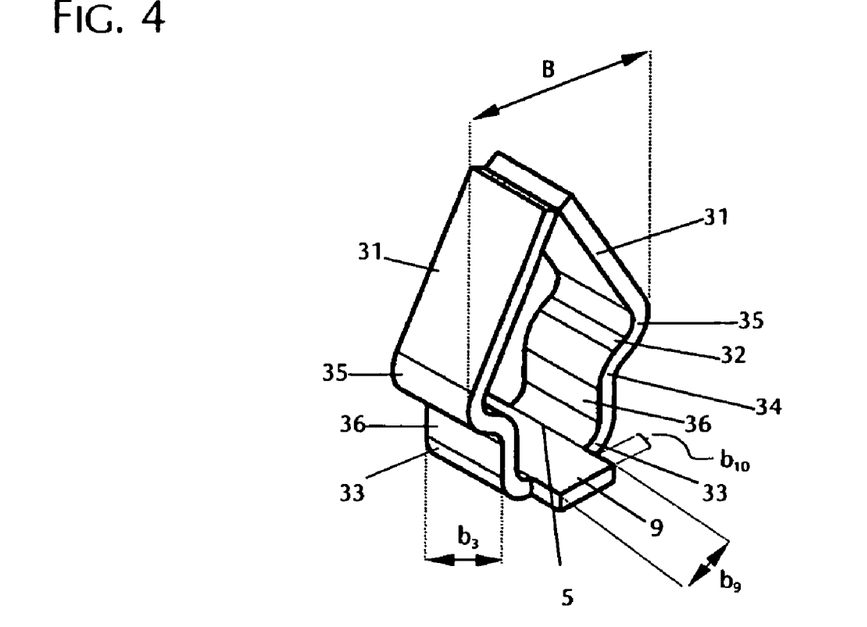
FIG. 4 schematically shows a partial view of the mounting device from FIG. 1.
Figure 5:
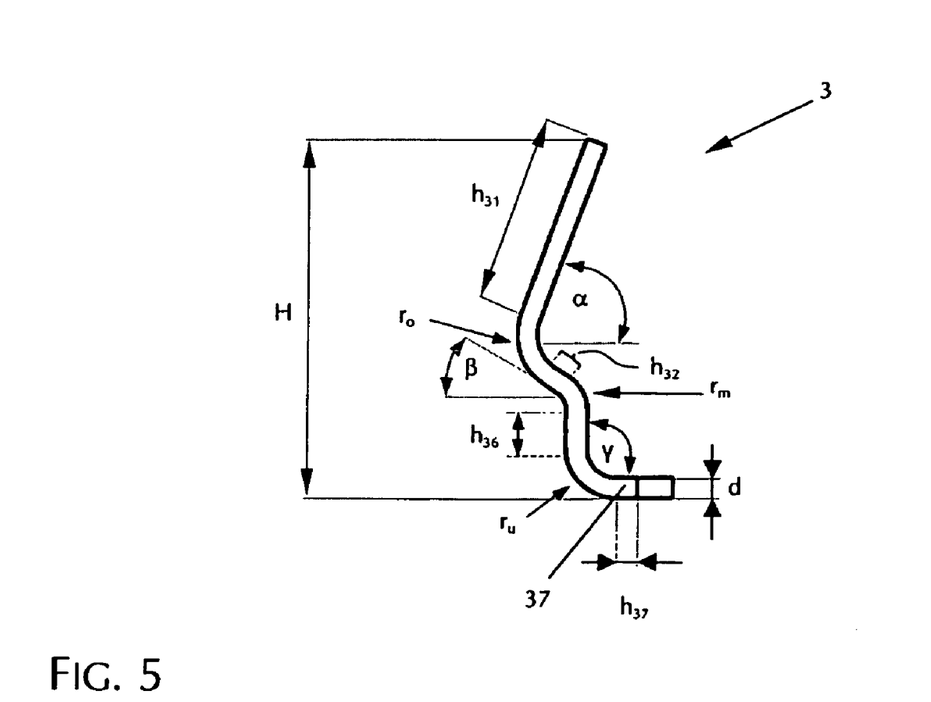
FIG. 5 schematically shows a side view of a fastening projection of the mounting device from FIG. 4.

FIGS. 4 and 5 serve for more precise explanation of the curve course and the dimensions of the fastening projections 3. The figures are each partial views of a mounting device 1 essentially corresponding to FIG. 1. FIG. 5 is the view of the forward lateral edge of the left fastening projection 3 illustrated in FIG. 4.

As recognizable in FIGS. 4 and 5, a widening section 37 running essentially in the plane of the base plate 2 first adjoins the web 9 connecting the two fastening projections 3. This widening section 37 is not absolutely necessary, but rather may also be dispensed with, so that the first bend of the fastening projection, around which the tab blank 4 is bent upward out of the plane of the base plate by the angle γ, may also lie directly adjoining the connection section 5. Preferred ranges for the lengths and widths of the particular sections and the bending angles will be explained in greater detail in the following on the basis of a table. However, it is already to be noted that all length and/or width specifications are identified by "h" or "b", respectively, and an index, whose number corresponds to the reference signs of the particular section of the fastening projection. The reference signs of the sections are almost exclusively shown in FIG. 4 and left out in FIG. 5 for better viewability, however.

Following the first bend around the angle γ, there is a lengthening section 36 essentially perpendicular to the base plate, using which the length of the fastening projections 3 to the protrusion sections 32 may be set up. These protrusion sections 32 each protrude from the diametrically opposite fastening projection 3 and outward toward the exterior of the group 6. Following the protrusion section 32, the fastening projection 3 then curves back inward again and inclines at its free end section 31 in the direction of the diametrically opposite fastening projection 3 toward the interior of the group 6. This implementation having an initially outwardly and upwardly projecting protrusion section and a free end section subsequently curving back inward allows the group of the fastening projections 3 to be inserted easily into a fastening opening of a counterpart to be fastened and this group to subsequently engage behind using the protruding sections 32.

Figure 6:
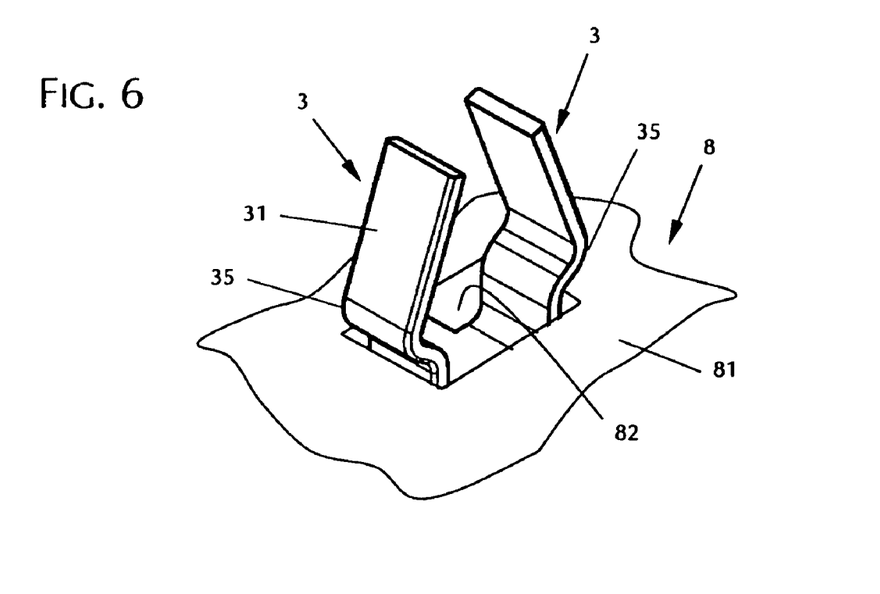
FIG. 6 schematically shows the mounting device from FIG. 4 retained on a counterpart.

This is shown as an example for a counterpart 8, which is a perforated plate 81 having a rectangular opening 82, in FIG. 6. Only a detail of the counterpart 8 is shown here. To fasten the mounting device 1, it is first guided through the hole 82 having the end sections 31 of the fastening projections 3 inclined toward one another in front. The fastening projections 3 are slightly moved toward one another elastically. After the broadest points of the group 6 of the fastening projections 3—i.e., the bending points 35—are pushed through, the fastening projections 3 subsequently spread out again, so that the protrusion sections 32 come to rest on the edge around the opening 82 of the perforated plate 81. The mounting device 1 is thus fastened on a counterpart 8.

Figure 7:
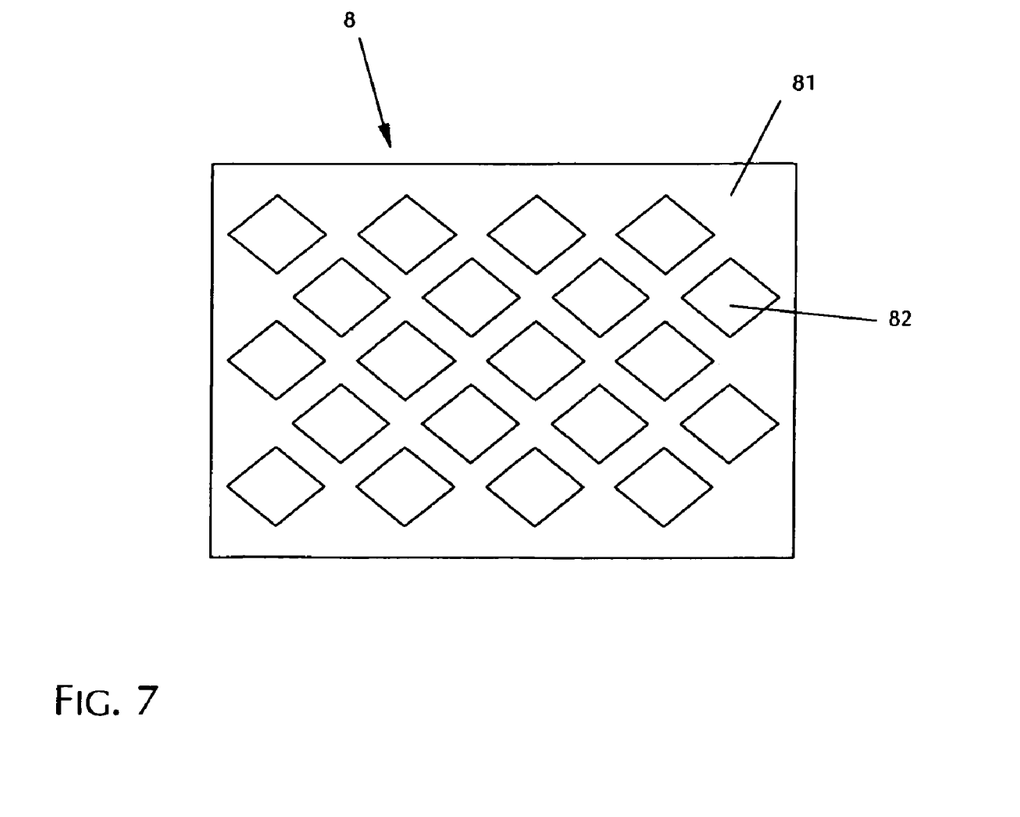
FIG. 7 schematically shows a counterpart in a top view.

In the preceding figures, a mounting device having only one pair of fastening projections 3 was described. In principle, a single pair of fastening projections may already be sufficient for adequate fastening. However, a mounting device according to the present invention will typically comprise multiple fastening projections 3 and generally also multiple groups 6 of fastening projections 3 assigned to one another. Accordingly, multiple fastening openings are also provided in the counterpart 8 to be fastened, in which the fastening projections 3 may engage. An example of such a counterpart is shown in FIG. 7. It is again a perforated plate 31, into which multiple holes 82 are introduced. In order to obtain the largest possible number of fastening openings 82 on the smallest possible area, the openings 82 are implemented here as a hexagonal hole pattern.

Figure 8:
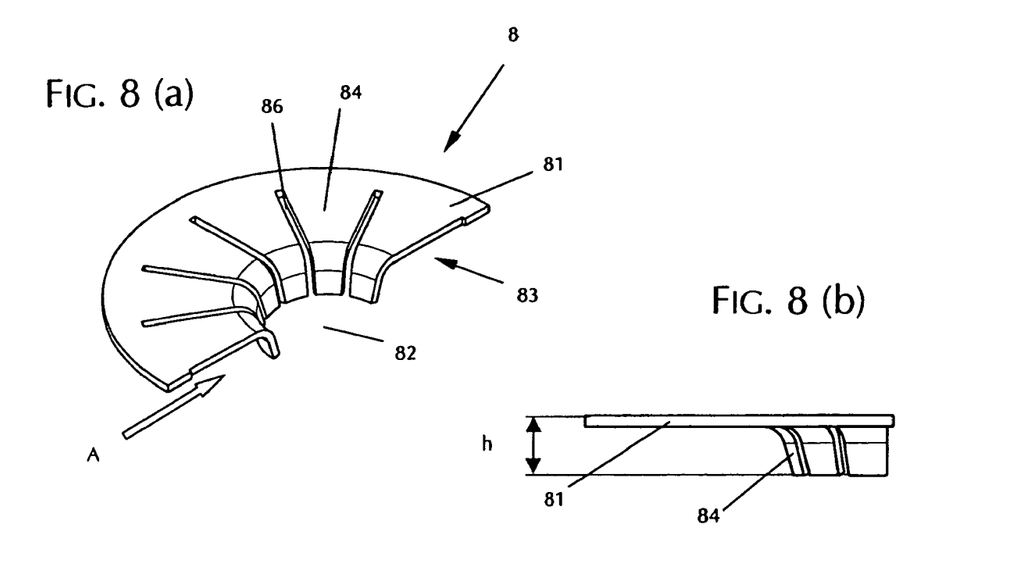
Figure 10:
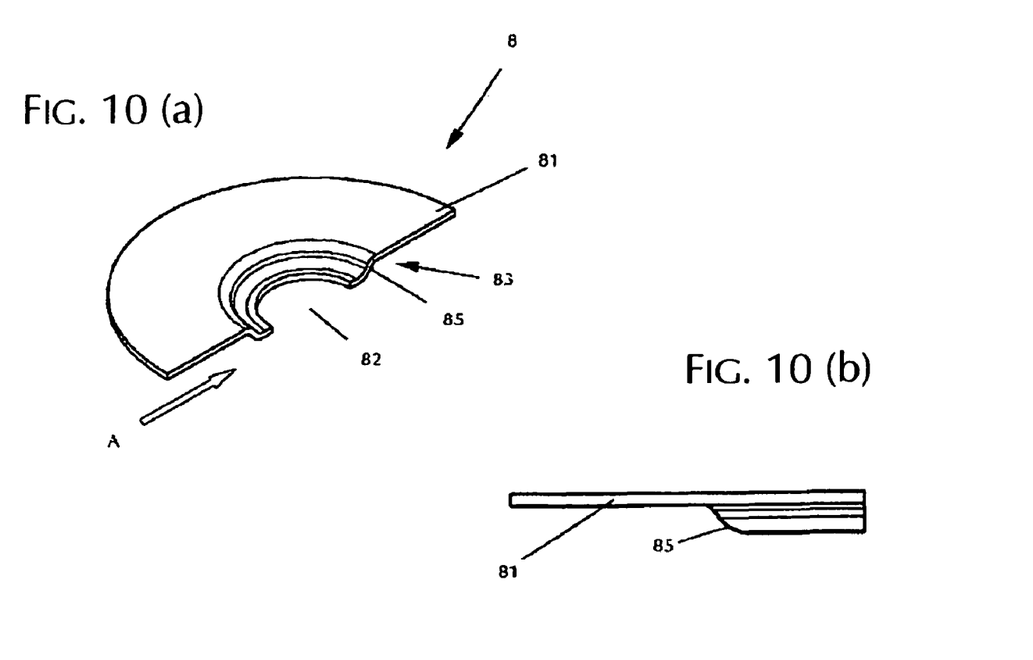
Figure 11:
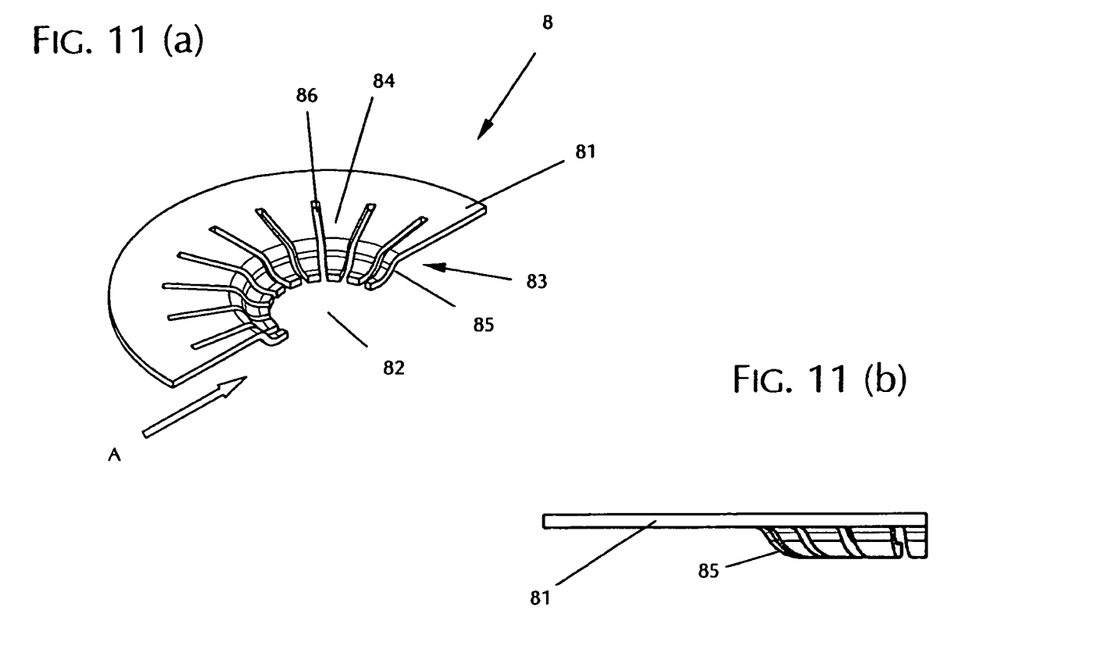

FIGS. 8, 10, and 11 each show further possible counterparts 8 for accommodating fastening projections 3. In each case, partial perspective views of perforated plates 81 are shown. FIGS. 8 (a), 10 (a), and 11 (a) each show sectional illustrations through the middle of a round hole 82. FIGS. 8 (b), 10 (b), and 11 (b) each show partial perspective side views in the direction of the arrow identified by A in the respective figure (a). The shape of the perforated plates 81 is not restricted to a round external contour, and the number of the holes 82 per perforated plate may additionally be greater than one.

Apart from the different shaping of the openings 82, the perforated plates 81 in FIGS. 8 (a) and 11 (a) differ from those in FIGS. 6 and 7 in that elastically deformable areas 84 are provided in the edge area 83 around the openings 82. These areas 84 are obtained in FIGS. 8 (a) and 11 (a) in that multiple radial incisions 86 are performed in the perforated plates 81 starting from the openings 82. The areas 84 may be deformed elastically upward or downward out of the plane of the perforated plate 81. FIG. 10 (a) dispenses with the radial incisions, the area around the opening 82 is predominantly plastically deformed and contains a bead 85.

The ends of the elastic areas 84 at the edge of the fastening opening 82 are beveled downward in FIG. 8 (a). The height h of these beveled areas is dimensioned so that it essentially corresponds to the height $h_{36}$ of the lengthening sections 36 of the fastening projections 3. The lengthening sections 36 come to rest laterally on the beveled areas of the elastic projections 84 after the insertion of the fastening projections 3. This makes the insertion of the fastening projections 3 of the mounting device 1 according to the present invention easier and, in addition, increases the elasticity of the composite thus formed.

Figure 9:
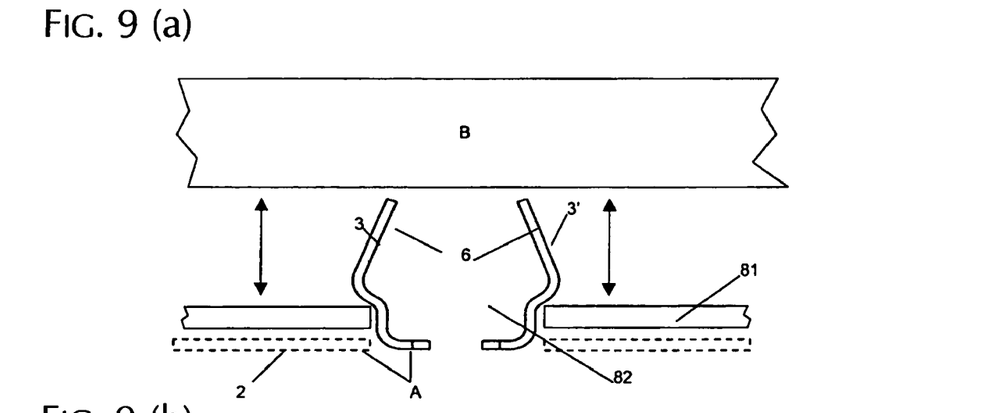

FIG. 9 (a) demonstrates the basic situation upon the fastening of an object A, which is formed by a group 6 (here a pair) of fastening projections 3 or 3', to an object B, with the aid of a perforated plate 81, which is to be attached to the object B. The situation in FIG. 9 (a) shows that it is not possible for the perforated plate 81 to adjoin the object B directly when the fastening projections are guided through the opening 82 of the perforated plate. It is only possible to fasten the perforated plate 81 to the object B at a very large distance to the opening 82, which in turn results in a very large play existing between the objects A and B, in which the perforated plate 81 may move in sections. The overall formation lacks the required pre-tension. In order to avoid the problem shown in FIG. 9 (a), it is possible in principle, but complex, to provide impressions 182 in the object B analogous to the holes 82 of the perforated plate 81, as shown in FIG. 9 (b). This configuration allows planar fastening of the object B to the perforated plate 81 using weld seams 183, without the fastening of the fastening projections 3, 3' in the hole 82 of the perforated plate being impaired thereby.

FIG. 9 (c) shows an alternative embodiment to that shown in FIG. 9 (b). For this purpose, a preferably peripheral bead 185 is introduced around the hole 82 of the perforated plate 81. This bridges the distance between the objects A and B, while the perforated plate 81 is simultaneously welded solidly to the object B in the area of the bead head 186. This may be performed using individual spot welds, partial or complete peripheral weld seams 183, or multiple weld seams 183'. Depending on the type and width of the bead 185 (full bead, half bead, right-angle bend), the size and shape of the hole 82, and the elasticity of the perforated plate 81, the bead 185 has more elastic or plastic character. The supporting effect of the bead(s) 185 and thus its pre-tension is also determined by the number of holes 82, the number of beads 185, and their distance and distribution within the perforated plate 81.

A detail from a perforated plate 81, which may be used as a counterpart 8 similarly as in FIG. 9 (c), is shown in FIG. 10. However, instead of the full bead 185 used in FIG. 9 (c), only a cranked area 85 similar to a half bead is embossed here. In addition, the perforated plate in FIG. 10 is shown with switched top and bottom in relation to FIG. 9 (c).

The counterpart illustrated in FIG. 11 differs from that of FIG. 8 essentially due to the different embodiment of the free end sections of the elastic projections 84. These end areas have a cranked area 85 like the counterpart in FIG. 10, which causes the free ends of the elastic sections 84 to lie in a plane which is located below the plane of the perforated plate 81. Therefore, the protrusion sections 32 are also lowered in relation to the plane of the perforated plate 81, due to which the free end sections 31 of the fastening projections 3 project less above the perforated plate 81. The overall composite of mounting device 1 and counterpart thus has a smaller thickness overall than if the cranked area 85 was not provided in the sections 84, and is simultaneously more stable.

Figure 12:
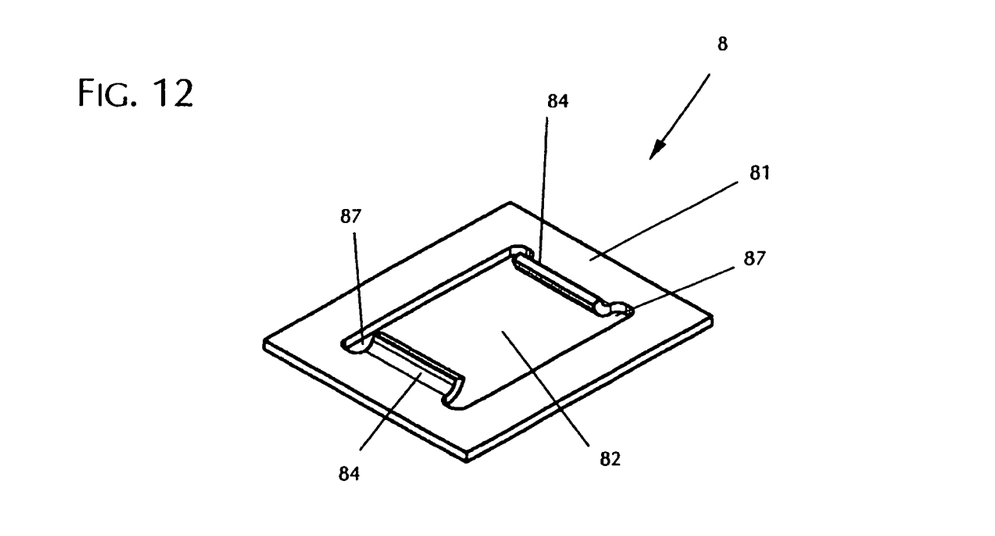
FIG. 12 schematically shows a top view of a further counterpart.

FIG. 12 shows a further possible counterpart 8 in a partial view of a perforated plate 81 like that shown in FIG. 7. The shaping of the opening 82 is essentially rectangular for accommodating a pair of opposite fastening projections 3 in a way similar to FIG. 6. Contrary to the simply rectangular opening 82 in this figure, there are two elastically deformable areas 84 protruding from both narrow sides of the openings 82. These areas 84 have an essentially rectangular shape and are connected with the perforated plate 81 via a respective one of their long sides. They are bent out bow-like to the same side of the perforated plate 81. In order to make the bending process easier and to avoid friction both during manufacture of the bent-out portions and during use the deformable areas 84 do not extend over the total length of the narrow edges of the opening 82 but are flanked by recesses 87. The areas 84 may be deformed elastically upward or downward out of the plane of the perforated plate 81. The dimensions of the areas 84 and the arrangement of the fastening projections therein may generally correspond to what has been described with reference to FIG. 8.

Preferred dimensions of the fastening projections 3 are summarized in the following table. Of course, the present invention is not restricted to these concrete values. "RS" is an abbreviation for the reference signs associated with the specified range in the figures.

| exemplary dimensions of fastening projection | RS | RS | dimensions/mm From | dimensions/mm To | preferred dimensions/mm From | preferred dimensions/mm To |
|---|---|---|---|---|---|---|
| free end section | 31 | $h_{31}$ | 0.5 | 3 | 1 | 2 |
| protrusion section | 32 | $h_{32}$ | 0.05 | 0.8 | 0.1 | 0.5 |
| lengthening section | 36 | $h_{36}$ | 0.1 | 1 | 0.3 | 0.7 |
| widening section | 37 | $h_{37}$ | 0 | 0.8 | 0.1 | 0.4 |
| total width of group | 6 | B | 0.5 | 6 | 1 | 5 |
| total height of fastening projection | 3 | H | 1 | 15 | 2 | 10 |
| width of fastening projection | 3 | $b_3$ | 0.2 | 5 | 0.5 | 2.5 |
| web | 9 | $b_9$ | 0.2 | 2 | 0.5 | 1 |
| free punch | 10 | $b_{10}$ | 0.1 | 4 | 0.3 | 1.5 |
| material thickness |  | d | 0.1 | 1 | 0.1 | 0.6 |
| bending radius top |  | $r_o$ | 0.3 | 0.7 | 0.4 | 0.6 |
| bending radius middle |  | $r_m$ | 0.3 | 0.7 | 0.4 | 0.6 |
| bending radius bottom |  | $r_u$ | 0.3 | 0.7 | 0.4 | 0.6 |

| | RS | /° From | /° To | /° (preferred) From | /° (preferred) To |
|---|---|---|---|---|---|
| bending angle | α | 50 | 85 | 55 | 80 |
| bending angle | β | −10 | 40 | 10 | 30 |
| bending angle | γ | 70 | 110 | 85 | 95 |

Figure 13:
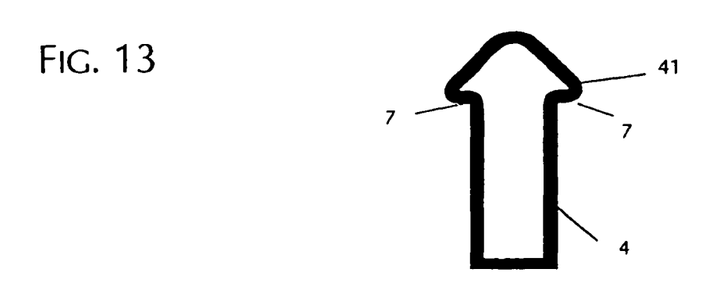
FIG. 13 schematically shows a top view of a tab blank.
Figure 14:
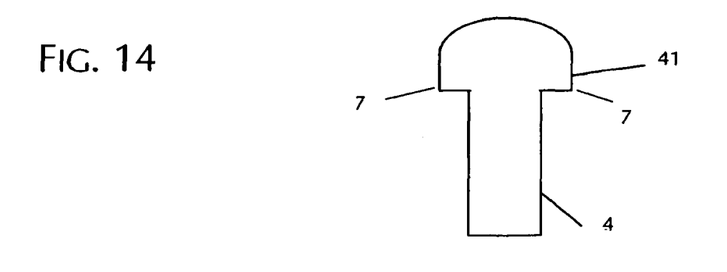
FIG. 14 schematically shows a top view of an alternative tab blank.
Figure 15:
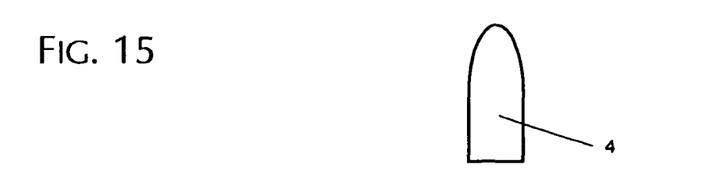
FIG. 15 schematically shows a top view of a further alternative tab blank.

The tab blanks 4, from which the fastening projections 3 were produced in all embodiments of the mounting device 1 described above, each have a rectangular basic shape. However, the present invention is not restricted to such tab blanks. Other examples are illustrated in FIGS. 13 and 14. These tab blanks 4 are also based in principle on a strip-like shape, but lateral projections 7 are provided in the head areas 41, which correspond to the free end sections 31 in the finished fastening projections 3. In the tab blank in FIG. 13, an arrow-shaped overall shape thus results, the tab blank 4 in FIG. 14 essentially has a mushroom shape. The widened heads of the tab blanks 4 may be used as protrusions during fastening of the fastening projections 3 and thus improve the durability of the connection produced. FIG. 15 shows a further embodiment of a tab blank 4. However, this has no lateral projections, rather its head area narrows toward the free end.

Figure 16:
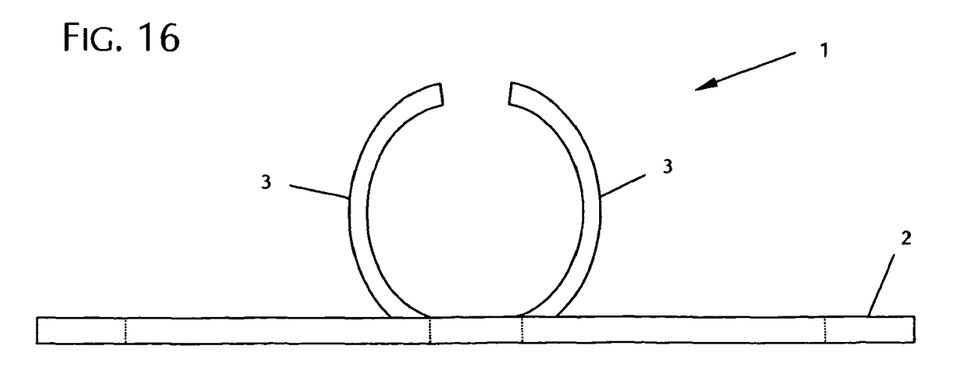
FIG. 16 schematically shows a side view of a further mounting device according to the present invention.

Finally, FIG. 16 shows an especially simple embodiment of a mounting device 1 according to the present invention in a side view of the lateral edges of the fastening projections 3. In this case as well, a group 6 comprises two diametrically opposite fastening projections 3, which are separated from one another by a web 9 in the base plate 2 between their connection sections 5. The basic shape of the fastening projections is again rectangular. According to the present invention, the fastening projections are again curved in such a way that in an area closer to the base plate 2, they first project outward and away from the diametrically opposite fastening projection 3, to then curve inward back to the diametrically opposite fastening projection 3 in an upper area. However, the curve course is essentially uniform here, so that C-shaped fastening projections result, whose openings point toward one another. The fastening principle corresponds to that of the embodiments described above.

The invention claimed is:

1. A mounting device having a metallic base plate, from which multiple fastening projections project, wherein it is obtainable by:
    a) incising multiple tab blanks into a surface of the base plate while leaving at least one connection section per tab blank; and
    b) producing the fastening projections by bending the tab blanks out of the base plate, such that the total height (H) of the fastening projection is from 1 to 15 mm;
    multiple fastening projections forming a group and the fastening projections within the group being bent in such a way that a section lying distal from the base plate is inclined toward the interior of the group and a section lying between connection section and inwardly inclined section projects toward the exterior of the group;
    wherein the area of the fastening projections is strip-like;
    wherein the fastening projections are situated neighboring one another;
    wherein the group comprises a pair of fastening projections which are essentially diametrically opposite;
    wherein the total width (B) of the group is from 0.5 to 6 mm; and
    wherein a free end section of the fastening projection is inclined as a whole toward the interior of the group.

2. The mounting device according to claim 1, wherein the connection sections of the fastening projections are situated along a ring.

3. The mounting device according to claim 2, wherein the connection sections of the fastening projections are situated along a polygonal ring.

4. The mounting device according to claim 3, wherein the connection sections of the fastening projections are situated along a square ring.

5. The mounting device according to claim 4, wherein the fastening projections each have at least two bending points in the area between the free end section and the connection section.

6. The mounting device according to claim 5, wherein the fastening projections each have at least three bending points in the area between the free end section and the connection section.

7. The mounting device according to claim 6, wherein the sections lying between the bending points are essentially planar.

8. The mounting device according to claim 7, wherein an outwardly projecting protrusion section between the connection section and the inwardly inclined section runs at an angle of −10° to 40° to the plane of the base plate.

9. The mounting device according to claim 8, wherein the outwardly projecting protrusion section between the connection section and the inwardly inclined section runs at an angle of 10 to 30° to the plane of the base plate.

10. The mounting device according to claim 8, wherein the outwardly projecting protrusion section between the connection section and the inwardly inclined section runs at an angle of 20 to 35° to the plane of the base plate.

11. The mounting device according to claim 8, wherein the fastening projections have a lengthening section in an area lying between the connection section and the protrusion section, which runs at an angle of 70 to 110° in relation to the plane of the base plate.

12. The mounting device according to claim 11, wherein the fastening projections have a lengthening section in an area lying between the connection section and the protrusion section, which runs at an angle of 85 to 95° in relation to the plane of the base plate.

13. The mounting device according to claim 12, wherein the fastening projections have a lengthening section in an area lying between the connection section and the protrusion section, which runs at an angle essentially perpendicularly in relation to the plane of the base plate.

14. The mounting device according to claim 11, wherein the fastening projections have a widening section in an area lying between the connection section and the lengthening section, which runs at an angle of −15 to 15° in relation to the plane of the base plate.

15. The mounting device according to claim 14, wherein the fastening projections have a widening section in an area lying between the connection section and the lengthening section, which runs at an angle of −5 to 5° in relation to the plane of the base plate.

16. The mounting device according to claim 15, wherein the fastening projections have a widening section in an area lying between the connection section and the lengthening section, which runs at an angle of essentially 0° in relation to the plane of the base plate.

17. The mounting device according to claim 14, wherein the
inwardly inclined section runs at an angle of 50 to 85° in relation to the plane of the base plate.

18. The mounting device according to claim 17, wherein the
inwardly inclined section runs at an angle of 55 to 80° in relation to the plane of the base plate.

19. The mounting device according to claim 18, wherein the
inwardly inclined section runs at an angle of preferably 60 to 78° in relation to the plane of the base plate.

20. The mounting device according to claim 4, wherein the fastening projections are bent essentially C-shaped.

21. The mounting device according to claim 1, wherein the base plate is made of spring steel.

22. The mounting device according to claim 1, wherein the fastening projections are implemented essentially uniformly.

23. The mounting device according to claim 22, wherein the fastening projections and groups of fastening projections are distributed essentially evenly on the surface of the base plate.

24. A mounting device having a metallic base plate, from which multiple fastening projections project, wherein it is obtainable by:
   a) incising multiple tab blanks into a surface of the base plate while leaving at least one connection section per tab blank; and
   b) producing the fastening projections by bending the tab blanks out of the base plate, such that the total height (H) of the fastening projection is from 1 to 15 mm;
   multiple fastening projections forming a group and the fastening projections within the group being bent in such a way that a section lying distal from the base plate is inclined toward the interior of the group and a section lying between connection section and inwardly inclined section projects toward the exterior of the group;
   wherein an outwardly projecting protrusion section between the connection section and the inwardly inclined section runs at an angle of −10° to 40° to the plane of the base plate;
   wherein the sections lying between the bending points are essentially planar;
   wherein the fastening projections each have at least two bending points in the area between free end section and connection section;
   wherein the fastening projections are situated neighboring one another;
   wherein the group comprises a pair of fastening projections which are essentially diametrically opposite;
   wherein the total width (B) of the group is from 0.5 to 6 mm; and
   wherein a free end section of the fastening projection is inclined as a whole toward the interior of the group.

25. The mounting device according to claim 24, wherein the fastening projections project on both sides of the base plate.

26. The mounting device according to claim 24, wherein the fastening projections project on one side of the base plate.

27. A mounting device having a metallic base plate, from which multiple fastening projections project, wherein it is obtainable by:
   a) incising multiple tab blanks into a surface of the base plate while leaving at least one connection section per tab blank; and
   b) producing the fastening projections by bending the tab blanks out of the base plate, such that the total height (H) of the fastening projection is from 1 to 15 mm;
   multiple fastening projections forming a group and the fastening projections within the group being bent in such a way that a section lying distal from the base plate is inclined toward the interior of the group and a section lying between connection section and inwardly inclined section projects toward the exterior of the group;
   wherein the fastening projections are implemented to engage in a counterpart;
   wherein the fastening projections are situated neighboring one another;
   wherein the group comprises a pair of fastening projections which are essentially diametrically opposite;
   wherein the total width (B) of the group is from 0.5 to 6 mm; and
   wherein a free end section of the fastening projection is inclined as a whole toward the interior of the group.

28. The mounting device according to claim 27, wherein the counterpart is selected from the group consisting of a knitted fabric, woven fabric, braid, scrim, plush, looped fleece, perforated plate made of plastic or steel, stainless steel, austenitic stainless steel, austenitic molybdenum stainless steel, high-temperature alloys, and nickel alloy.

29. The mounting device according to claim 28, wherein the counterpart is implemented as a woven fabric having an open screen area of at least 40%.

30. The mounting device according to claim 29, wherein the counterpart is implemented as a woven fabric having an open screen area of at least 48%.

31. The mounting device according to claim 30, wherein the counterpart is implemented as a woven fabric having an open screen area of at least 57%.

32. The mounting device according to claim 28, wherein the counterpart is implemented as a perforated plate and the holes are each implemented to accommodate one group of fastening projections.

33. The mounting device according to claim 32, wherein the edge area of the perforated plate has elastically deformable areas, beads, and a cranked area around the holes.

34. The mounting device according to claim 33, wherein the edge area of the perforated plate has elastically deformable areas, beads, or a cranked area around the holes.

35. The mounting device according to claim 32, wherein said mounting device has prefixing elements corresponding to the counterpart.

* * * * *